(12) United States Patent
Snape et al.

(10) Patent No.: US 10,563,592 B2
(45) Date of Patent: Feb. 18, 2020

(54) TURBO COMPRESSOR FOR BLEED AIR

(71) Applicant: United Technologies Corporation, Hartford, CT (US)

(72) Inventors: Nathan Snape, Tolland, CT (US); Brian D. Merry, Andover, CT (US); Allan R. Penda, Amston, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 782 days.

(21) Appl. No.: 13/715,202

(22) Filed: Dec. 14, 2012

(65) Prior Publication Data

US 2014/0165588 A1 Jun. 19, 2014

(51) Int. Cl.
*F02C 9/18* (2006.01)
*B64D 13/04* (2006.01)
(Continued)

(52) U.S. Cl.
CPC ............... *F02C 9/18* (2013.01); *B64D 13/04* (2013.01); *B64D 13/08* (2013.01); *F01D 17/105* (2013.01); *F02C 6/08* (2013.01); *F02C 6/12* (2013.01); *F02C 7/141* (2013.01); *B64D 2013/0618* (2013.01); *Y02T 50/675* (2013.01)

(58) Field of Classification Search
CPC ...... F02C 9/18; F02C 6/08; F02C 7/18; F02C 7/141; F02C 7/185; F02C 6/12; Y02T 50/671; Y02T 50/676; Y02T 50/675; F05D 2220/327; F01D 11/24; F01D 17/105; F05B 2220/50; F05B 2220/40; B64D 2013/0603; B64D 2013/0666; B64D 2013/0607; B64D 2013/0618; B64D 13/08; B64D 15/04; B64D 13/02; B64D 13/04; B64D 13/06
See application file for complete search history.

(56) References Cited

U.S. PATENT DOCUMENTS 3,367,256 A * 2/1968 Townsend .............. B64D 13/02
137/114
3,428,242 A * 2/1969 Rannenberg ........... B64D 13/06
415/180
(Continued)

FOREIGN PATENT DOCUMENTS

EP 2613035 A2 7/2013

OTHER PUBLICATIONS

International Search Report and Written Opinion for International Application No. PCT/US2013/074009 dated Mar. 17, 2014.
(Continued)

*Primary Examiner* — Alain Chau
(74) *Attorney, Agent, or Firm* — Carlson, Gaskey & Olds, P.C.

(57) ABSTRACT

A disclosed bleed air system utilizes high pressure air from a high pressure compressor to drive the turbo compressor to increase a pressure of bleed air drawn from the low pressure compressor. Air drawn from the low pressure compressor is at a lower temperature and pressure than that encountered from the high pressure compressor. The turbo compressor increases the pressure of airflow and provides that airflow into the main bleed air passage to be communicated to systems utilizing the bleed air.

13 Claims, 3 Drawing Sheets

(51) Int. Cl.
*B64D 13/08* (2006.01)
*F02C 6/08* (2006.01)
*F02C 6/12* (2006.01)
*F02C 7/141* (2006.01)
*B64D 13/06* (2006.01)
*F01D 17/10* (2006.01)

(56) References Cited

U.S. PATENT DOCUMENTS

| | | | | |
|---|---|---|---|---|
| 4,285,466 | A * | 8/1981 | Linscheid | G05D 23/1393 |
| | | | | 165/298 |
| 4,967,565 | A | 11/1990 | Thomson et al. | |
| 5,137,230 | A * | 8/1992 | Coffinberry | B64C 21/06 |
| | | | | 244/118.5 |
| 5,161,364 | A | 11/1992 | Bruun et al. | |
| 5,967,461 | A * | 10/1999 | Farrington | B64D 13/06 |
| | | | | 244/118.5 |
| 6,112,523 | A * | 9/2000 | Kamo | F02B 37/013 |
| | | | | 60/600 |
| 6,189,324 | B1 * | 2/2001 | Williams | B64D 13/06 |
| | | | | 62/172 |
| 6,305,156 | B1 * | 10/2001 | Lui | B64D 13/06 |
| | | | | 454/76 |
| 6,615,574 | B1 | 9/2003 | Marks | |
| 6,695,578 | B2 | 2/2004 | Winslow et al. | |
| 7,305,842 | B1 | 12/2007 | Schiff | |
| 7,624,592 | B2 * | 12/2009 | Lui | B64D 13/06 |
| | | | | 60/224 |
| 7,721,549 | B2 * | 5/2010 | Baran | 60/770 |
| 8,047,903 | B1 | 11/2011 | Schiff | |
| 8,206,088 | B1 * | 6/2012 | Plattner | B64D 13/06 |
| | | | | 415/143 |
| 8,602,088 | B2 * | 12/2013 | Solntsev | B64D 13/00 |
| | | | | 165/41 |
| 8,904,805 | B2 * | 12/2014 | Hipsky | F02C 6/08 |
| | | | | 244/57 |
| 8,967,528 | B2 * | 3/2015 | Mackin | F02C 6/08 |
| | | | | 244/53 R |
| 2004/0141836 | A1 | 7/2004 | McAuliffe et al. | |
| 2005/0115249 | A1 * | 6/2005 | Haas | B64D 13/06 |
| | | | | 62/86 |
| 2009/0211221 | A1 | 8/2009 | Roberge | |
| 2010/0089056 | A1 * | 4/2010 | Cooper | F01D 15/10 |
| | | | | 60/605.1 |
| 2010/0095672 | A1 * | 4/2010 | An | F01D 17/105 |
| | | | | 60/602 |
| 2010/0107594 | A1 * | 5/2010 | Coffinberry et al. | 60/39.093 |
| 2010/0314877 | A1 * | 12/2010 | Finney | F01D 15/10 |
| | | | | 290/52 |
| 2011/0203293 | A1 | 8/2011 | Glahn | |
| 2012/0167587 | A1 | 7/2012 | Clark et al. | |
| 2012/0180509 | A1 * | 7/2012 | DeFrancesco | B64D 13/08 |
| | | | | 62/172 |
| 2012/0186267 | A1 | 7/2012 | Coffinberry et al. | |
| 2012/0216545 | A1 | 8/2012 | Sennoun et al. | |
| 2013/0040545 | A1 * | 2/2013 | Finney | B64D 13/06 |
| | | | | 454/71 |
| 2013/0174573 | A1 * | 7/2013 | Hipsky | F02C 6/08 |
| | | | | 60/785 |
| 2013/0187007 | A1 * | 7/2013 | Mackin | F02C 6/08 |
| | | | | 244/134 R |

OTHER PUBLICATIONS

International Preliminary Report on Patentability for International Application No. PCT/US2013/074009 dated Jun. 25, 2015.
Extended European Search Report for EP Application No. 13863329.2 dated Jul. 6, 2016.

* cited by examiner

TURBO COMPRESSOR FOR BLEED AIR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The turbine section operates at elevated temperatures and therefore cooling air from the relatively cool compressor section is bleed off and directed to the turbine section. Moreover, the gas turbine supplies air for other aircraft system such as environmental control and wing anti-icing systems. Increasingly efficient gas turbine engines operate at higher temperatures and therefore heat exchange devices for cooling the bleed air to desired temperatures become larger and more complex.

Although increasing gas turbine engine efficiencies provide many benefits, turbine engine manufacturers must continue to meet packaging and airframe bleed air requirements and therefore seek further improvements to bleed air systems.

SUMMARY

A bleed air system for a gas turbine engine according to an exemplary embodiment of this disclosure, among other possible things includes a main passage communicating air to an aircraft system, a turbo compressor driven by a turbine, an inlet to the turbo compressor communicating air from a first compressor location at a first pressure, an inlet to the turbine communicating air from a second compressor location at a second pressure higher than the first pressure for driving the turbine, and an outlet from the turbo compressor communicating air at a third pressure greater than the first pressure to the main air passage.

In a further embodiment of the foregoing bleed air system, includes an outlet from the turbine communicating air to the main air passage.

In a further embodiment of any of the foregoing bleed air systems, includes a heat exchanger disposed in the main air passaged downstream of the outlet from the turbo compressor.

In a further embodiment of any of the foregoing bleed air systems, includes a first valve controlling flow from the second compressor location to the turbine.

In a further embodiment of any of the foregoing bleed air systems, includes a second valve controlling flow through the main air passaged downstream of the turbo compressor and turbine outlets.

In a further embodiment of any of the foregoing bleed air systems, the first compressor location includes a location within a low pressure compressor of the gas turbine engine.

In a further embodiment of any of the foregoing bleed air systems, the second compressor location includes a location within a high pressure compressor of the gas turbine engine.

A gas turbine engine according to an exemplary embodiment of this disclosure, among other possible things includes a fan including a plurality of fan blades rotatable about an axis. A compressor section includes a low pressure compressor and a high pressure compressor. The high pressure compressor operates at a pressure greater than the low pressure compressor. A combustor is in fluid communication with the compressor section. A turbine section is in fluid communication with the combustor. A geared architecture is driven by the turbine section for rotating the fan about the axis. A main air passage communicates air to an aircraft system. A turbo compressor includes a first inlet communicating air from the low pressure compressor at a first pressure. A second inlet communicates air from the high pressure compressor at a second pressure for driving the turbo compressor. An outlet communicates air at a third pressure greater than the first pressure to the main bleed air passage.

In a further embodiment of the foregoing gas turbine engine, includes an outlet from the turbo compressor communicating air from the high pressure compressor to the main air passage.

In a further embodiment of any of the foregoing gas turbine engines, includes a heat exchanger disposed in the main bleed air passage downstream of the outlet from the turbo compressor.

In a further embodiment of any of the foregoing gas turbine engines, includes a first valve controlling flow from the high pressure compressor to the turbo compressor.

In a further embodiment of any of the foregoing gas turbine engines, includes a second valve controlling flow through the main bleed air passage downstream of the turbo compressor.

In a further embodiment of any of the foregoing gas turbine engines, includes a check valve in the main passage upstream of the first inlet.

A method of operating a bleed air system for a gas turbine engine according to an exemplary embodiment of this disclosure, among other possible things includes communicating air from a first compressor portion at a first temperature and first pressure into a main passageway, and communicating air from a second compressor portion at a second temperature and a second pressure to power a turbo compressor. The second temperature is greater than the first temperature and the second pressure is greater than the first pressure, and compressing air from the first compressor portion to a third pressure greater than the first pressure and communicating the compressed air to a main bleed air passage.

In a further embodiment of the foregoing method, includes the step of combining air from the second compressor portion powering the turbo compressor in the main bleed air passage.

In a further embodiment of any of the foregoing methods, includes the step of cooling air from the second compressor portion through the turbo compressor.

In a further embodiment of any of the foregoing methods, the first compressor portion includes a low pressure compressor and the second compressor portion includes a high pressure compressor of the gas turbine engine.

In a further embodiment of any of the foregoing methods, directs bleed air in the main bleed air passage through a heat exchanger downstream of the turbo compressor.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
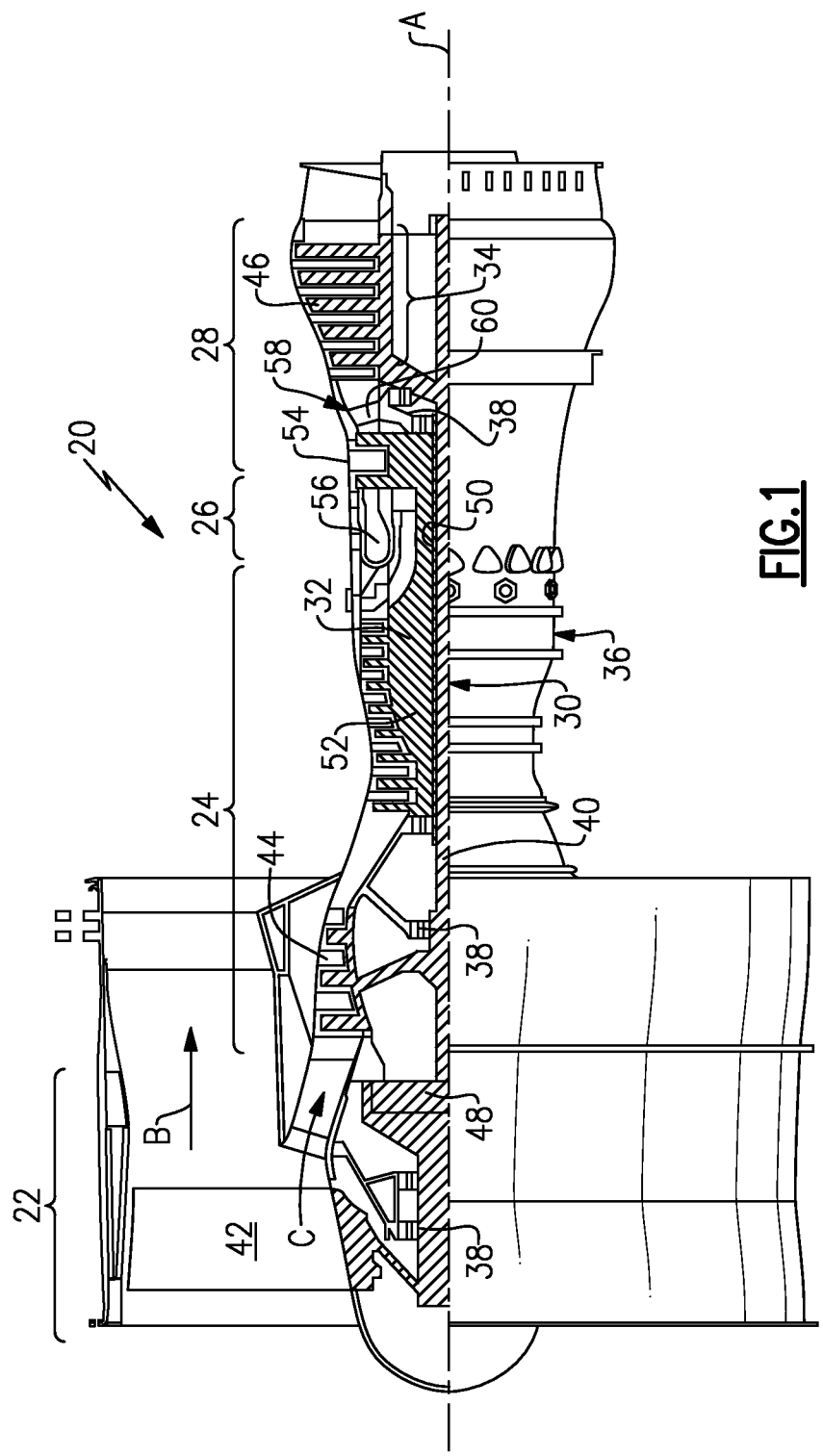
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
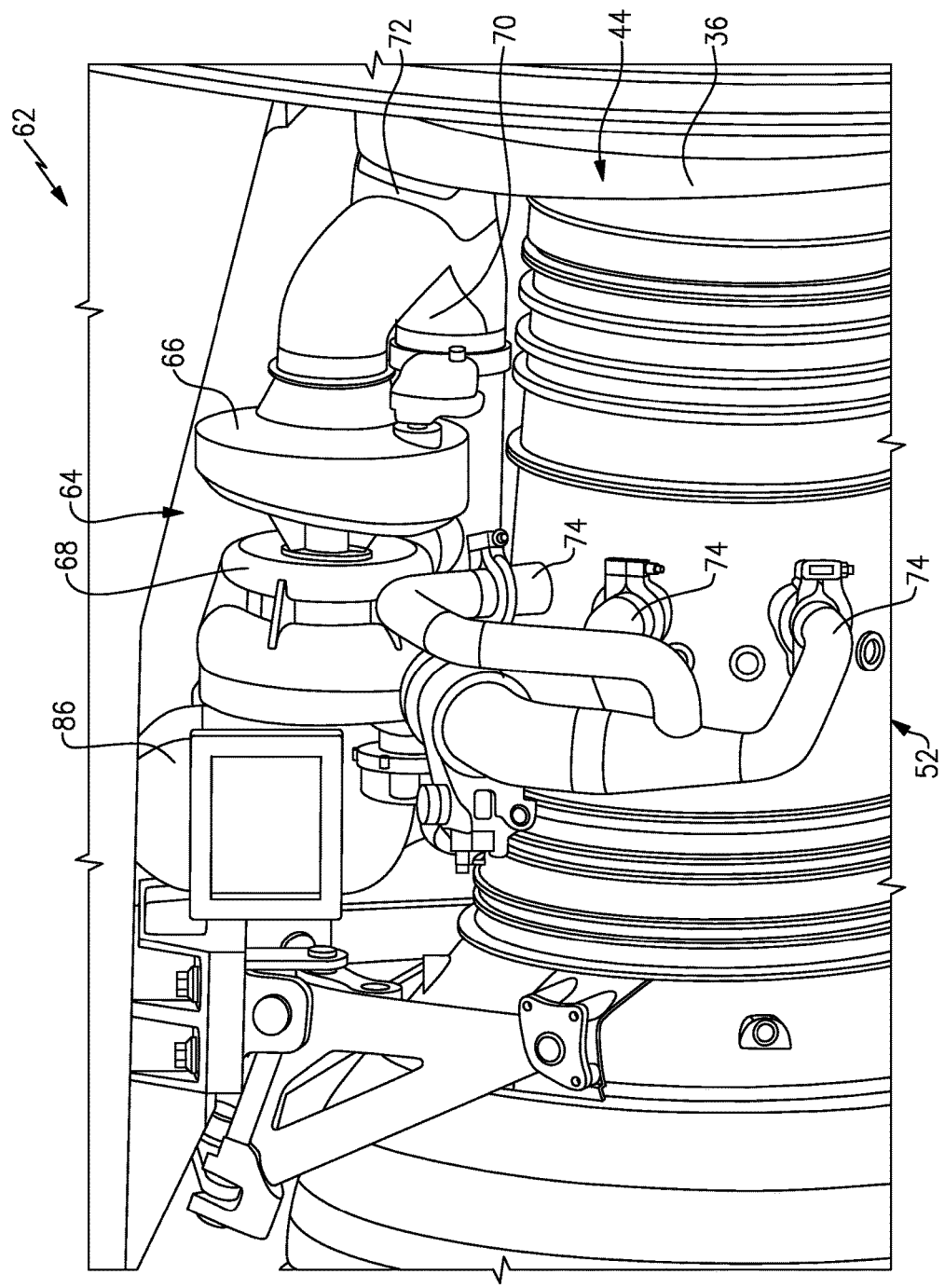
FIG. 2 is a schematic view of an example bleed air system.

Referring to FIG. 2, an example bleed air system 62 includes a turbo compressor 64 that includes a compressor 66 and a turbine 68. The turbine 68 drives the compressor 66 to compress air communicated through and from the low pressure compressor 44. The low pressure compressor 44 includes an outlet 72 that communicates air to the compressor 66. The high pressure compressor 52 includes a plurality of bleed air outlets 74 that communicate air to the turbine 68. The turbine 68 drives the compressor 66 to raise a pressure of air communicated from the low pressure compressor 44. A heat exchanger 86 is disposed downstream of the turbo compressor 64 and provides cooling of bleed air before it is communicated to aircraft systems that utilize the bleed air.

Figure 3:
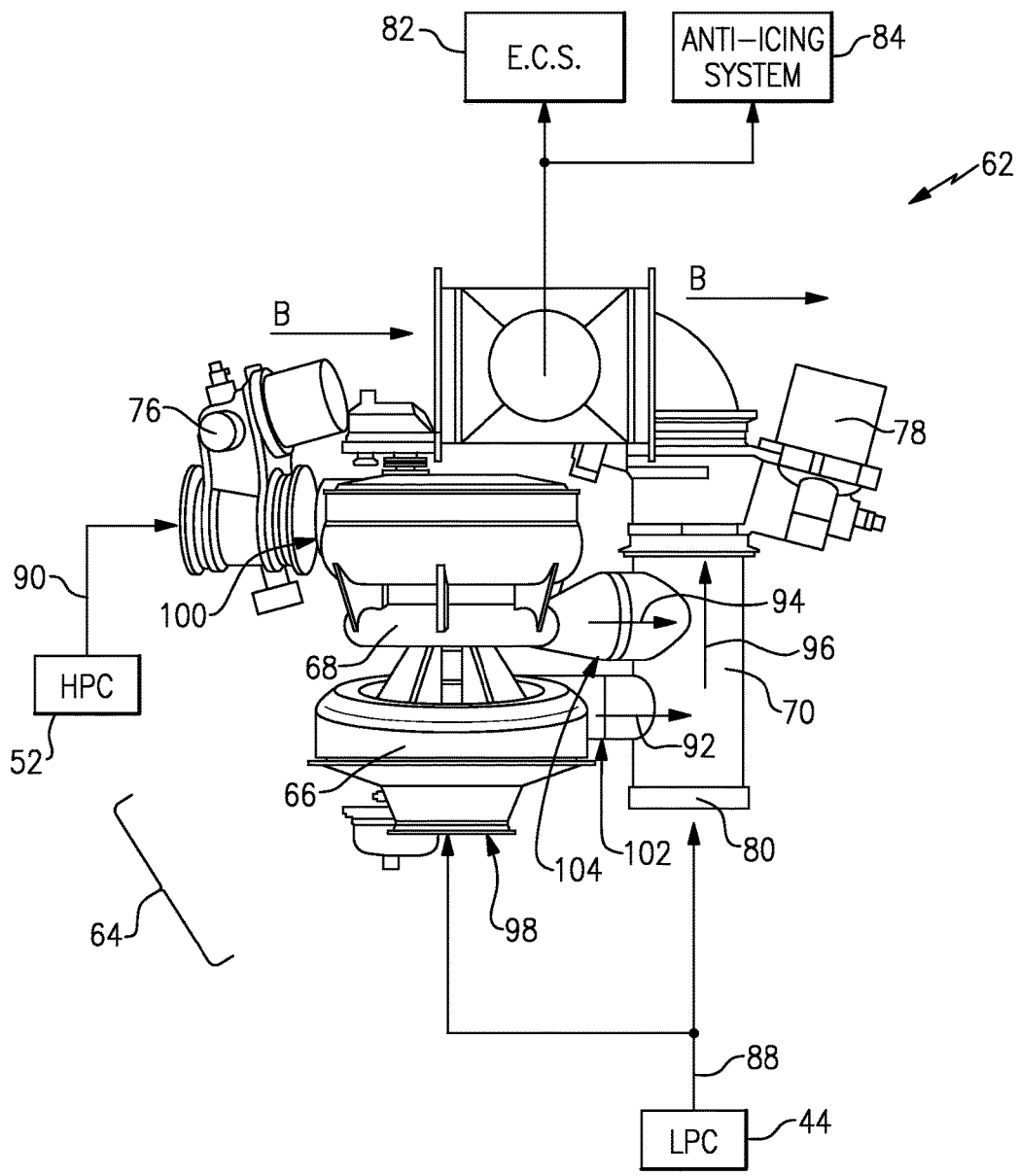
FIG. 3 is another schematic view of an example bleed air system.

Referring to FIG. 3, a schematic representation of the example bleed air system 62 shows the turbo compressor 64 that includes the compressor 66 and the turbine 68. The turbine 68 is powered by high airflow 90 from the high pressure compressor 52. The high airflow 90 is communicated to the turbine 68 through a control valve 76. The control valve 76 communicates the high airflow 90 from the high pressure compressor 52 through an inlet 100.

The low pressure compressor 44 communicates a low airflow 88 at a first temperature and first pressure. The first temperature and first pressure are lower than a second temperature and second pressure of the high airflow 90. The low airflow 88 is communicated to an inlet 98 of the compressor 66. A portion of the low airflow 88 from the low pressure compressor 44 is also communicated to a main bleed air passage 70 through a check valve 80. A portion of the low airflow 88 is communicated and bypasses the turbo compressor 64 and flows directly into the main air passage 70.

High airflow 90 is communicated to drive the turbine 68 and then is exhausted through an outlet 104 as exhaust airflow 94. The exhaust airflow 94 is of a reduced temperature and pressure as compared to the inlet high airflow 90.

Low airflow 88 communicated to the compressor 66 is elevated in pressure and communicated as main airflow 92 to the main bleed air passage 70. The main airflow 92 flows through an outlet 102 of the compressor 66 at an elevated pressure as compared to the inlet low airflow 88.

The turbo compressor 64 draws the low airflow 88 from the low pressure compressor 44 at a low temperature and elevates a pressure of the low airflow 88 to a desired pressure as the main flow 92. Additional airflow exhausted from the turbine 68 is mixed in with the airflow 92 in the main passage 70 to provide a desired pressure and temperature required for systems that are supplied by the example bleed air system 62.

A control valve 78 controls bleed airflow through the main passage 70 and through a heat exchanger 86. In this example, the heat exchanger 86 is disposed within the bypass airflow B (FIG. 1) to provide cooling of the combined airflows 96 through the main passage 70. The control valve 78 will control bleed air 96 through the main passage 70 that is communicated to the aircraft systems.

In this example, the bleed air systems 62 communicates air to an environmental control system schematically indicated at 82 and/or a wing anti-icing system schematically indicated at 84. As appreciated, it is within the contemplation of this disclosure that the bleed air system could also supply bleed air at a specific temperature and pressure for other aircraft systems as would be required for operation of the engine or for operation of other aircraft system and functions.

The example bleed air system utilizes high pressure air from the high pressure compressor 52 to drive the turbo compressor 64 such that it may elevate the bleed air drawn from the low pressure compressor 44. As appreciated, air drawn from the low pressure compressor 44 is at a lower temperature and pressure than that encountered from the high pressure compressor. Accordingly, the low airflow 88 from the low pressure compressor 44 is at the desired temperature but is not at the desired pressure. The turbo compressor 64 increases the pressure of airflow and provides that airflow into the main bleed air passage 70 to be communicated to the aircraft system 82, 84.

In operation, the example bleed air system 62 draws air from outlet 72 disposed on a case structure 36 of the low compressor section 44. The airflow 88 from the low pressure compressor 44 is directed to the main air passage 70 and a portion is also directed to an inlet 98 of the compressor 66.

The turbine 68 receives air through an inlet 100 from the high pressure compressor 52. The high airflow 90 communicated through the inlet 100 drives the turbine 68 which in turn drives the compressor 66. The control valve 76 controls the turbine 68 to provide for increases in the airflow 88.

During engine idling on the ground or descent where the low pressure compressor 44 is operating at a low capacity, the airflow 88 will be at a lower pressure and temperature then when at takeoff or cruise operating parameters. Accordingly, the control valve 76 enables the calibration and governing of operation of the turbo compressor 64 to enhance the pressure of low airflow 88 from the low pressure compressor 44 when that pressure is not within the desired operating range required by the aircraft systems 82, 84.

Additionally, high airflow 90 that is used to power the turbine 68 is exhausted into the main passage 70 and mixes with the elevated pressure airflow 92 from the low pressure compressor 44. The mixing of airflows 88 and 90 within the main bleed air passage 70 provide the desired pressure and temperature of bleed airflow that is utilized by the aircraft systems.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A bleed air system for a gas turbine engine comprising:
a main passage communicating air to an aircraft system;
a turbo compressor driven by a turbine;
an inlet to the turbo compressor receiving a first portion of air from a first compressor location at a first pressure, the turbo compressor raising a pressure of the first portion of air from the first pressure to a third pressure greater than the first pressure;
an inlet to the turbine receiving air from a second compressor location at a second pressure higher than the first pressure for driving the turbine;
an outlet from the turbo compressor communicating the first portion of air at the third pressure directly to the main passage;
an outlet of the turbine communicating the air from the second compressor location directly into the main passage, the air from the second compressor location mixing with the first portion of air from the first compressor location at the third pressure in the main passage;

a passage communicating a second portion of air from the first compressor location at the first pressure through a check valve into the main passage, such that the second portion of air from the first compressor portion bypasses the turbo compressor and turbine and forms a combined air flow by mixing with the first portion of air at the third pressure from the outlet of the turbo compressor and the air from the second compressor location from the outlet of the turbine, wherein the combined air flow is communicated through the main passage to the aircraft system; and a heat exchanger disposed in the main passage downstream of the outlet from the turbo compressor and the outlet of the turbine.

2. The bleed air system as recited in claim 1, including a first valve controlling the air from the second compressor location to the turbine.

3. The bleed air system as recited in claim 2, including a second valve controlling the combined air flow through the main passage downstream of the outlet from the turbo compressor and the outlet from the turbine.

4. The bleed air system as recited in claim 1, wherein the first compressor location comprises a location within a low pressure compressor of the gas turbine engine.

5. The bleed air system as recited in claim 1, wherein the second compressor location comprises a location within a high pressure compressor of the gas turbine engine.

6. The bleed air system as recited in claim 1, wherein the check valve is between the passage communicating the second portion of air from the first compressor location and the main passage.

7. A gas turbine engine comprising:
    a fan including a plurality of fan blades rotatable about an axis;
    a compressor section including a low pressure compressor and a high pressure compressor, wherein the high pressure compressor operates at a pressure greater than the low pressure compressor;
    a combustor in fluid communication with the compressor section;
    a turbine section in fluid communication with the combustor;
    a geared architecture driven by the turbine section for rotating the fan about the axis;
    a main passage communicating air to an aircraft system;
    a turbo compressor including a first inlet receiving a first portion of air from the low pressure compressor at a first pressure, the turbo compressor raising a pressure of the first portion of air from the first pressure to a third pressure greater than the first pressure;
    a second inlet communicating air from the high pressure compressor at a second pressure greater than the first pressure to a turbine for driving the turbo compressor;
    a first outlet from the turbo compressor communicating the first portion of air at the third pressure into the main passage;
    a second outlet communicating the air from the high pressure compressor from the turbine into the main passage;
    a passage communicating a second portion of air from the low pressure compressor at the first pressure through a check valve into the main passage, the second portion of air bypassing the turbo compressor and turbine and forming a combined air flow by mixing directly with the first portion of air from the first outlet from the turbo compressor and the air from the high pressure compressor from the second outlet from the turbine within the main passage, the combined air flow communicated to the aircraft system via the main passage; and
    a heat exchanger disposed in the main passage downstream of the outlet from the turbo compressor and the second outlet from the turbine.

8. The gas turbine engine as recited in claim 7, including a first valve controlling the air from the high pressure compressor to the turbine.

9. The gas turbine engine as recited in claim 8, including a second valve controlling the combined air flow through the main passage downstream of the first outlet from the turbo compressor and the second outlet from the turbine.

10. The gas turbine engine as recited in claim 7, wherein the check valve is in the main passage upstream of the first outlet from the turbo compressor.

11. A method of operating a bleed air system for a gas turbine engine comprising:
    communicating a first portion of air from a first compressor portion at a first temperature and first pressure into a main passage;
    communicating a second portion of air from a second compressor portion at a second temperature and a second pressure to a turbine that drives a turbo compressor, wherein the second temperature is greater than the first temperature and the second pressure is greater than the first pressure;
    compressing a third portion of air from the first compressor portion from the first pressure to a third pressure greater than the first pressure using the turbo compressor, and communicating the third portion of air at the third pressure into the main passage;
    continuously bypassing the first portion of air from the first compressor portion at the first temperature and first pressure around the turbo compressor through a check valve to pass directly into the main passage, and forming a combined air flow by mixing the first portion of air at the first temperature and first pressure with the second portion of air from an outlet of the turbine and the third portion of air at the third pressure from the turbo compressor within the main passage;
    directing the combined air flow in the main passage through a heat exchanger downstream of the turbo compressor and into an aircraft system.

12. The method as recited in claim 11, including the step of cooling the second portion of air from the second compressor portion by passing the air through the turbine that drives the turbo compressor.

13. The method as recited in claim 11, wherein the first compressor portion comprises a low pressure compressor and the second compressor portion comprises a high pressure compressor of the gas turbine engine.

* * * * *